Dec. 8, 1936.　　　　G. A. BEARD　　　　2,063,537
TERRACING AND GRADING ATTACHMENT FOR TRACTORS
Filed July 23, 1936　　　4 Sheets-Sheet 1

Inventor
G. A. Beard
By　Knowles
　　Attorneys

Patented Dec. 8, 1936

2,063,537

UNITED STATES PATENT OFFICE 2,063,537

TERRACING AND GRADING ATTACHMENT FOR TRACTORS

George A. Beard, San Angelo, Tex.

Application July 23, 1936, Serial No. 92,231

6 Claims. (Cl. 37—178)

This invention relates to a terracing and grading attachment for use in connection with various types of farm tractors, an object being to provide a scraper which can not only be adjusted angularly for the purpose of deflecting the loosened soil either to the right or to the left, but is also capable of up and down adjustment at the will of the operator, for the purpose of obtaining the desired slope.

A further object is to provide an attachment of this character which is simple and compact in construction and, with slight modifications in the arrangement of the connections, can be adapted for various types of tractors without requiring the services of a skilled mechanic.

A further object is to provide a scraping blade connected directly to the tractor structure and having its adjusting levers all positioned where they are accessible readily from the driver's seat.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 1:
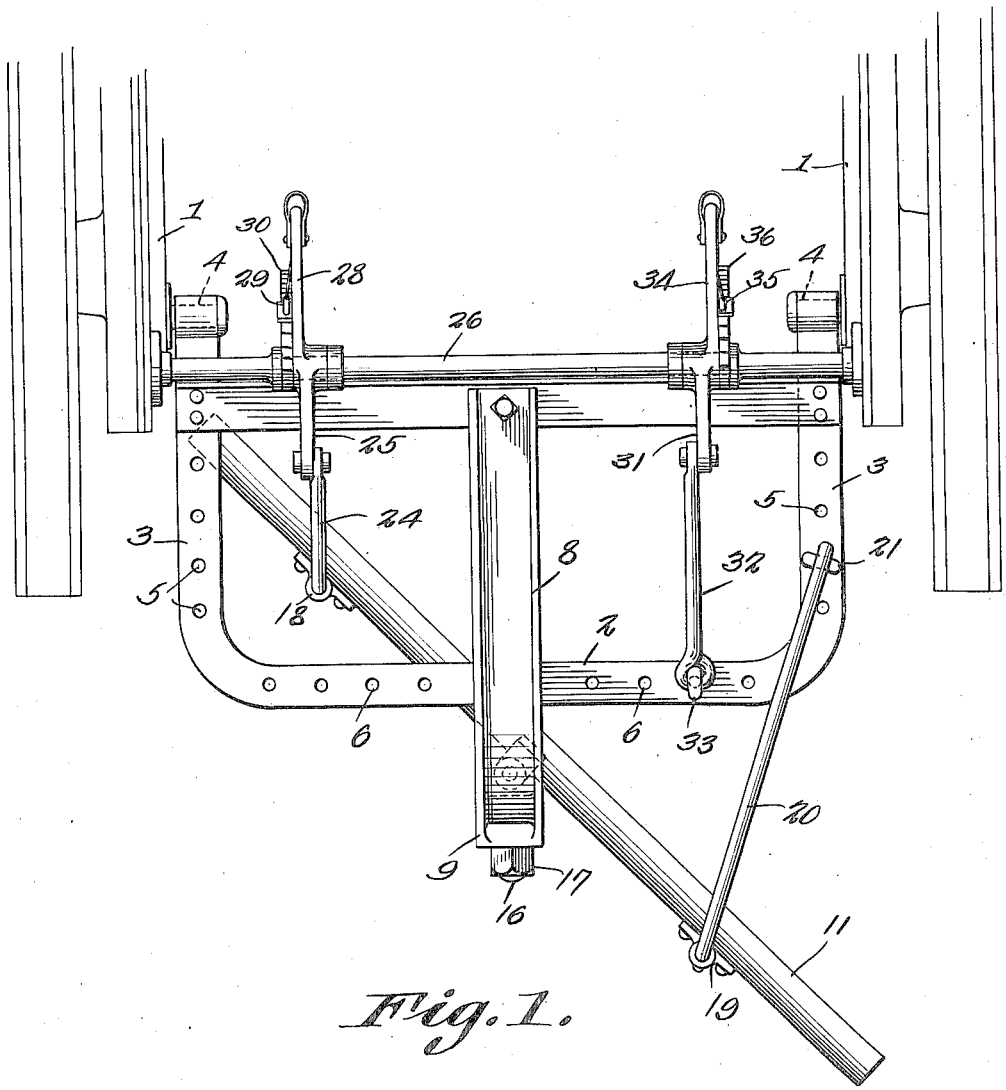
Figure 1 is a plan view of a portion of a tractor equipped with an attachment such as constitutes the present invention.

Referring to the figures by characters of reference, 1 designates a portion of a tractor which, in the present instance, is of the type known as a "Farmall" but it is to be understood that, if desired, the present improvements can be applied to other types of tractors used in farming. In the structure illustrated there is provided a substantially U-shaped draw-bar 2 the side arms 3 of which are connected to the frame of the tractor as indicated at 4 and formed with longitudinal series of apertures 5. The rear or intermediate portion of the draw-bar is also formed with a series of apertures 6. The side arms 3 are joined by a cross bar 7 from which is extended an I beam 8 the back end portion of which is downturned to provide a standard 9 terminating in a bearing sleeve 10.

The scraper blade has been indicated at 11 and is of any suitable length. This blade is formed with a concave forward or advancing face 12, its lower edge constituting means for engaging and scraping the surface of the soil. To the back thereof are secured brackets 13 arranged one above the other. These brackets carry a pivot bolt 14 on which a sleeve 15 is mounted. From this sleeve is extended a stem 16 bearing within sleeve 10 and held in position therein by a nut 17 or any other suitable means. Thus it will be seen that the blade 11 is capable of swinging about pin 14 and also about pin 16, thus providing adjustment within two intersecting planes.

Secured to the rear or convex surface of the blade adjacent to each end, are brackets 18 and 19 respectively. These are duplicates and are adapted to be engaged by adjusting and restraining means.

Figure 3:
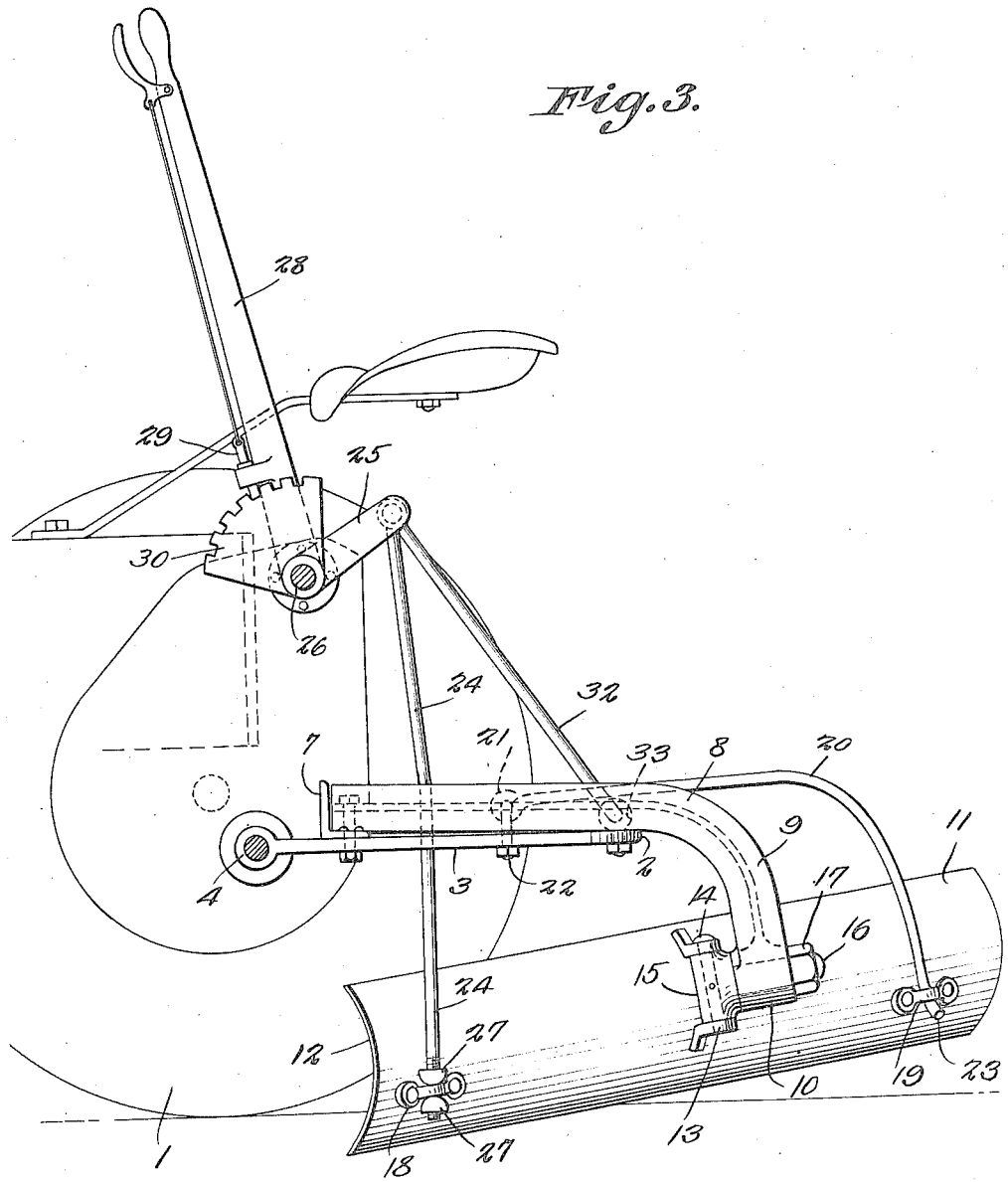
Figure 3 is a side elevation of the structure shown in Figure 1.
Figure 4:
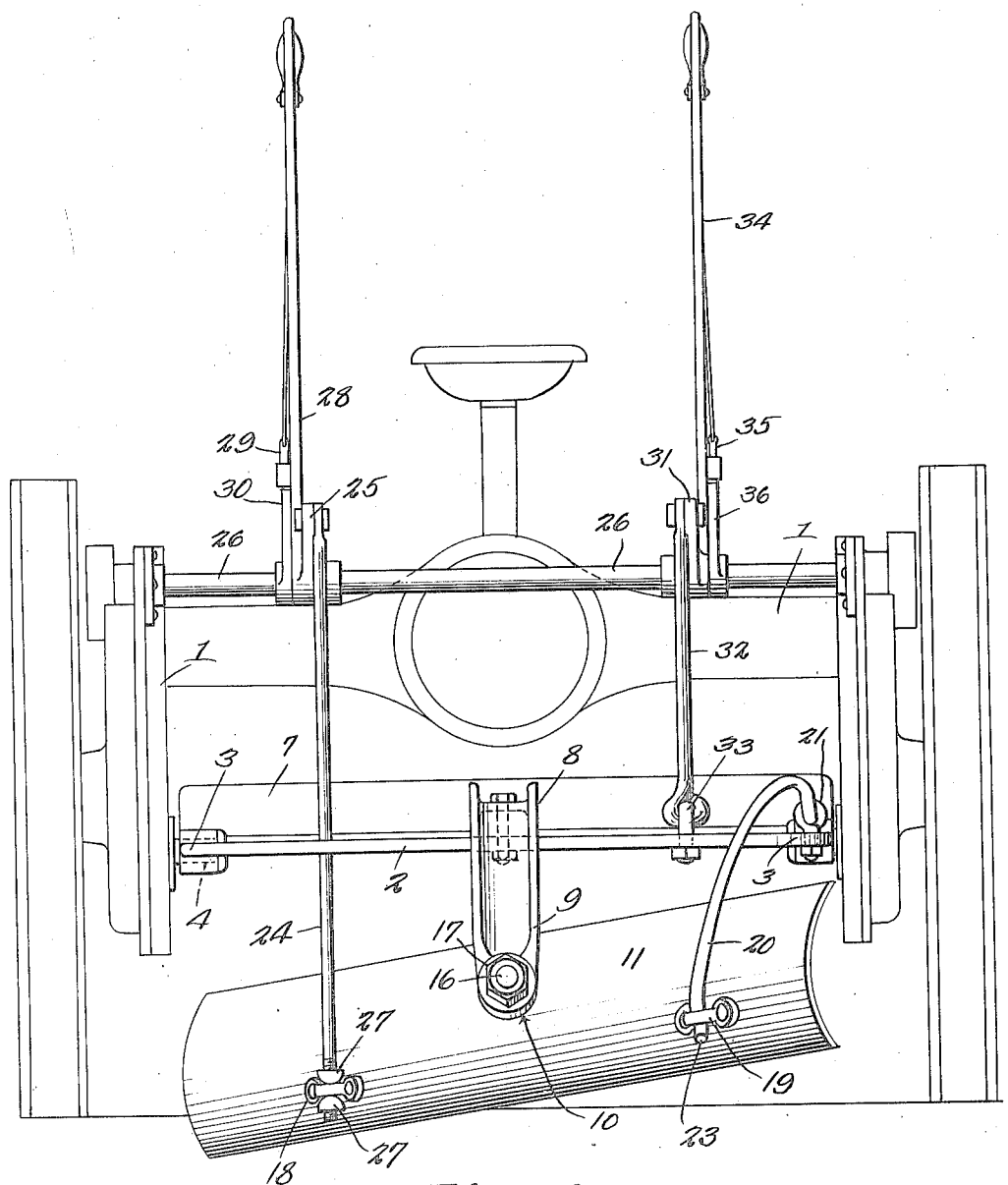
Figure 4 is a rear elevation.

The restraining means is in the form of a rod 20 one end of which is formed with an eye 21 pivotally connected to one of the arms 3 by an eye bolt 22 anchored in any one of the apertures 5. The other end of the restraining element is downturned and extended back of the blade and through one of the brackets. In Figures 1, 3, and 4, it has been shown in the bracket 19. The free end of the restraining rod it outturned as indicated at 23 so that the blade will not drop off of the rod.

When this rod 20 is located in bracket 19, the other bracket, 18, is engaged by an adjusting rod 24 extending downwardly from a lifting arm 25 mounted for rotation on a transverse shaft 26 carried by the tractor frame. This rod is formed with opposed rounded nuts 27 located below and above bracket 18 so as to bear thereagainst and provide a rocking connection between the rod and the blade. Arm 25 has a lever 28 connected thereto and provided with a dog 29 for engagement with a toothed segment 30 on the tractor, whereby the lever and its arm 25 can be held in any position to which it may be adjusted.

Another lifting arm 31 is mounted to swing on the shaft 26 and has a rod 32 connecting it to an eye bolt 33 anchored within any one of the apertures 6. A lever 34 extends from this arm and has a dog 35 for engaging a stationary toothed segment 36 whereby the lever and its lifting arm 31 can be held against movement.

With the parts located as shown in Figures 1, 3, and 4, it will be noted that when the tractor is moved forwardly, the soil in the path of the scraper will be deflected toward the right. The restraining element 30 will prevent the blade from swinging out of any position to which it may be adjusted and by manipulating the lever 28, rod 24 can be operated to lift or to depress the forward end of the blade. Also, by adjusting lever 34 and its arm 31, rod 32 may be operated to raise or lower the entire scraper relative to the surface of the ground. Or, by means of this latter adjustment, the blade can be raised or lowered relative to the forward end thereof so as to change the angle of the blade relative to the surface of the soil.

Figure 2:
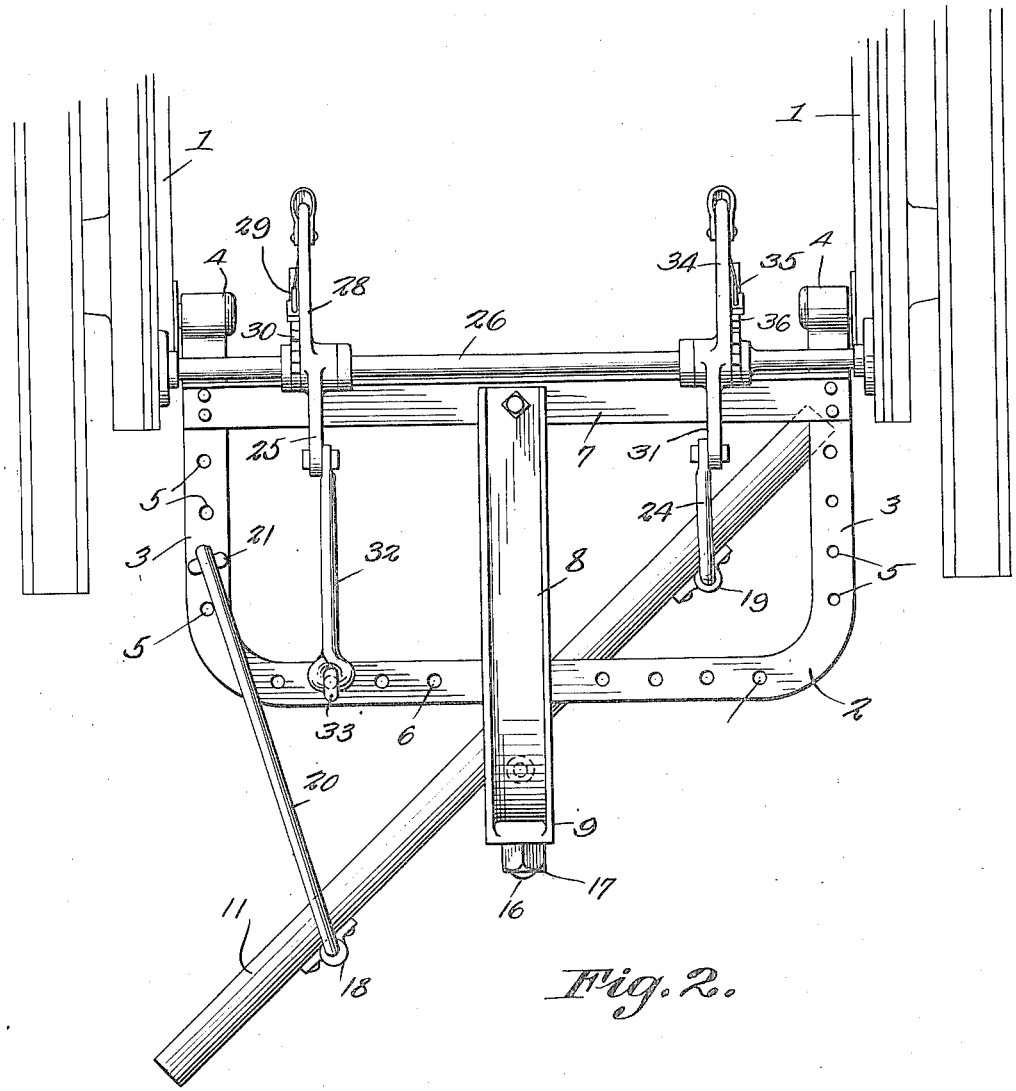
Figure 2 is a similar view showing the blade of the scraper adjusted to another position.

As shown in Figure 2, the positions of the parts can be reversed readily. This can be done by disconnecting the restraining rod 20 from the position shown in Figure 1 and transferring it to the other side of the draw-bar as shown in Figure 2. The positions of the connections 24 and 32 are also changed so that rod 24 will engage bracket 19 while rod 32 will extend from arm 25 to the draw-bar 2. The restraining member is transferred to the left side of the draw-bar and placed in engagement with bracket 18. Thus the blade will be held at an angle opposite to that previously occupied as will be noted by comparing Figure 2 with the position of the parts shown in Figure 1.

The structure herein described is very simple, compact and efficient, and is advantageous not only because of the ease with which it may be applied to a farm tractor, but also because of the ease with which it can be adjusted to scrape the surface at any desired angle for the purpose of building and maintaining terraces and ditches, for light grading, etc.

What is claimed is:

1. A scraping attachment for farm tractors, including a draw-bar, a beam extending thereacross downwardly therebelow, a blade mounted adjacent to its center on the beam for up and down and front and back swinging movement relative thereto, movable means connecting one end portion of the blade to the draw-bar to hold it against backward and forward swinging movement, and adjustable means under the control of an operator for raising and lowering the other end of the blade.

2. The combination with a tractor and a draw-bar extending backwardly therefrom, of a beam extending over and downwardly from the draw-bar, a blade connected adjacent to its center to the beam for swinging movement about vertical and horizontal axes, a restraining element adjustably connected to the cross bar and attached and movably connected to one end portion of the blade, and means under the control of an operator for raising and lowering the other end of the blade.

3. The combination with a draw-bar of a tractor, and a beam extending thereacross downwardly therebelow, of a blade connected adjacent to its center to the beam for movement about substantially horizontal and vertical axes, a restraining element movably and adjustably connected to the draw-bar and extending back of and movably joined to one end portion of the blade, and means under the control of an operator for raising and lowering the other end portion of the blade.

4. The combination with a draw-bar of a tractor, and a beam extending thereacross downwardly therebelow, of a blade connected adjacent to its center to the beam for movement about substantially horizontal and vertical axes, a restraining element movably and adjustably connected to the draw-bar and extending back of and movably joined to one end portion of the blade, and means under the control of an operator for raising and lowering the other end portion of the blade, said means including an arm mounted for swinging movement, a rod extending from the arm and adjustably connected to the blade for lifting and for depressing the same at one end, and means for locking the arm against movement, thereby to maintain the blade at a predetermined distance relative to the surface of the soil thereunder.

5. The combination with a tractor and a draw-bar pivotally connected thereto, of a beam extending across said draw-bar and downwardly relative thereto, means under the control of an operator for raising and lowering the draw-bar and the beam, a blade connected at its center to the beam and mounted to swing relative thereto about substantially horizontal and vertical axes, restraining means adjustably connected to the draw-bar extending back of and movably connected to one end portion of the blade, and means under the control of an operator for elevating and depressing the blade at its other end.

6. The combination with a tractor and a draw-bar pivotally connected thereto, of a beam extending across said draw-bar and downwardly relative thereto, means under the control of an operator for raising and lowering the draw-bar and the beam, a blade connected at its center to the beam and mounted to swing relative thereto about substantially horizontal and vertical axes, restraining means adjustably connected to the draw-bar and extending back of and movably connected to one end portion of the blade, and means under the control of an operator for elevating and depressing the blade at its other end, said means including an arm, a lever for actuating the arm, a rod extending from the arm and back of the blade, and adjustable connections between the rod and the blade for transmitting lifting or thrusting forces to the blade, and means for locking the lever against movement.

GEORGE A. BEARD.